US011354271B2

(12) United States Patent
Yeager et al.

(10) Patent No.: US 11,354,271 B2
(45) Date of Patent: Jun. 7, 2022

(54) SYSTEMS AND METHODS FOR LARGE SCALE COMPLEX STORAGE OPERATION EXECUTION

(71) Applicant: Verizon Digital Media Services Inc., Dulles, VA (US)

(72) Inventors: Donnevan Scott Yeager, Anderson Island, WA (US); Harkeerat Singh Bedi, Los Angeles, CA (US); Derek Shiell, Santa Monica, CA (US)

(73) Assignee: Edgecast Inc., Dulles, VA (US)

( * ) Notice: Subject to any disclaimer, the term of this patent is extended or adjusted under 35 U.S.C. 154(b) by 336 days.

(21) Appl. No.: 16/677,209

(22) Filed: Nov. 7, 2019

(65) Prior Publication Data
US 2021/0141763 A1    May 13, 2021

(51) Int. Cl.
    *G06F 16/16*      (2019.01)
    *G06F 16/2455*    (2019.01)
    *G06F 16/13*      (2019.01)
    *G06F 16/17*      (2019.01)
    *G06F 16/14*      (2019.01)

(52) U.S. Cl.
    CPC ............ *G06F 16/162* (2019.01); *G06F 16/13* (2019.01); *G06F 16/148* (2019.01); *G06F 16/1734* (2019.01); *G06F 16/24557* (2019.01)

(58) Field of Classification Search
    CPC .... G06F 16/162; G06F 16/13; G06F 16/1734; G06F 16/148
    USPC ........................................................ 707/691
    See application file for complete search history.

(56) References Cited

U.S. PATENT DOCUMENTS

| 5,666,528    | A  | * | 9/1997  | Thai     | G06F 16/24557 707/802 |
| 5,727,196    | A  | * | 3/1998  | Strauss, Jr. | G06F 16/24542 707/696 |
| 9,336,263    | B2 | * | 5/2016  | Abadi    | G06F 16/2386 |
| 2010/0121839 | A1 | * | 5/2010  | Meyer    | G06F 16/972 707/769 |
| 2014/0006354 | A1 | * | 1/2014  | Parkison | G06F 16/172 707/661 |
| 2014/0229513 | A1 | * | 8/2014  | Shiell   | G06F 16/185 707/803 |
| 2015/0347440 | A1 | * | 12/2015 | Habouzit | G06F 16/1873 707/824 |

(Continued)

*Primary Examiner* — Shahid A Alam
(74) *Attorney, Agent, or Firm* — Ansari Katiraei LLP; Arman Katiraei; Sadiq Ansari

(57) ABSTRACT

A Multi-Threaded Indexed ("MTI") file system may use a first set of threads, processes, or executable instances to index desired file attributes in a database while simultaneously but independently executing file operations with a second set of threads, processes, or executable instances. In response to receiving a file operation, the second set of threads, processes, or executable instance may query the database to directly identify files that are indirectly implicated by the file operation with a wildcard, regular expression, and/or other expression that indirectly identifies the files based on different file attributes, paths, name expressions, or combinations thereof. The second set of threads, processes, or executable instances are therefore able to identify the files implicated by the file operation based solely on the indexed file attributes already entered in the database without the need to load and scan the metadata of files in directories targeted by the file operation.

20 Claims, 9 Drawing Sheets

(56) References Cited

U.S. PATENT DOCUMENTS

| | | | |
|---|---|---|---|
| 2017/0060856 A1* | 3/2017 | Turtle | G06F 16/93 |
| | | | 707/742 |
| 2017/0220651 A1* | 8/2017 | Mathew | G06F 16/248 |
| | | | 707/722 |
| 2020/0250086 A1* | 8/2020 | Khan | G06F 16/9024 |

* cited by examiner

SYSTEMS AND METHODS FOR LARGE SCALE COMPLEX STORAGE OPERATION EXECUTION

BACKGROUND

A file system may be used to manage the storage and removal of files from one or more storage devices. The file system may store metadata for each stored file. The metadata may identify the file size, file type, last access time, time-to-live ("TTL"), and/or other attributes that the file system may use for file tracking, storing, removing, and/or other file management.

There is overhead associated with the file metadata. The file system may load, into memory, the metadata for all files in a directory, and may scan the metadata in order to identify which files are implicated by an operation that targets a subset of files in that directory based on one or more of the file attributes. Operations that are defined with wildcards, regular expressions, or other expressions are examples of some operations that may require the loading and scanning of metadata for files in one or more directories before the implicated files for those operations can be identified.

In some cases, the overhead associated with loading and scanning the metadata after receiving an operation may degrade file system performance and/or performance of the overall device that uses the file system to provide file access for other running applications, functions, services, etc. For instance, caching servers, that operate as part of a Content Delivery Network ("CDN") or that otherwise respond to requests for different content or services, may continually cache, access, and remove large quantities of files (e.g., billions of files) from one or more storage devices in short amounts of time. A caching server may receive hundreds of file operations every second, and each operation may implicate a different set of files. The file system may be unable to read the metadata of the stored files in order to identify the different sets of files implicated by each operation at the rate of the incoming operations. Accordingly, file system performance may suffer, and the device may be unable to perform other functions as a result of a backlogged and/or bottlenecked file system.

Moreover, a caching server may have irregular storage patterns. One example of an irregular storage pattern may include storing millions of files for a particular content provider in a single directory associated with that particular content provider. Performing a file system operation against files in such a large directory may include loading and scanning gigabytes worth of file metadata in memory with the scanning consuming a significant amount of processing resources.

These issues may be exacerbated when the file system supports complex multi-dimensional operations. For instance, a multi-dimensional purge operation may include purging files based on a combination of their TTL and last access time. The file system may perform two scans of the file metadata in the targeted directories upon receiving the multi-dimensional purge operation. The first scan may identify which files satisfy the TTL condition, and the second scan may identify which files satisfy the last access time condition. Another example of a complex multi-dimensional operation may include purging according to a probabilistic cache replacement policy. The probabilistic cache replacement policy may specify removal of files based on different weights that are provided to different file attributes. The file system may compute the weight and/or resulting probability value for each candidate file in a targeted directory after receiving the complex multi-dimensional operation. Computing the weight may involve providing a probability or score for different files based on different file attribute values that are evaluated as part of the probabilistic cache replacement policy (e.g., first weight/probability for files based on their file size, and second weight/probability for files based on their last access time). Here again, the metadata overhead involved in processing such a complex multi-dimensional operation may degrade performance of the file system and/or performance of the device running the file system, thereby preventing the file system from scaling to execute large scale complex purging.

DETAILED DESCRIPTION OF PREFERRED EMBODIMENTS

The following detailed description refers to the accompanying drawings. The same reference numbers in different drawings may identify the same or similar elements.

Disclosed are systems and methods for large scale complex storage operation execution. The systems and methods may include a Multi-Threaded Indexed ("MTI") file system. The MTI file system may provide efficient execution of storage operations on a device that may access vast quantities of files (e.g., billions of files) with regular or irregular storage patterns as a result of receiving a high volume of regular and/or complex multi-dimensional storage operations. In particular, the MTI file system may execute the storage operations, without loading and/or scanning the metadata of files in targeted directories, based on prior indexing of file attributes from the file metadata.

In some embodiments, the MTI file system may index a set of desired file attributes for newly stored files and modified files while simultaneously but independently executing file operations based on file attributes that have been indexed. For instance, the MTI file system may run a first set of executable instances to detect newly stored files and changes to existing files, and to generate and/or update database indexes based on desired attributes, from the metadata of the newly stored files or changed files, that can be used to define different storage operations. The MTI file system may simultaneously run a second set of executable instances that independently execute incoming storage operations based on the database indexes created by the first set of executable instances. In particular, an executable instance from the second set of executable instances may directly identify files, that are implicated by a particular file operation, based on file attribute values used to define the particular file operation mapping and/or matching to the database indexes. In some embodiments, the second set of executable instances may query the database for files with set indexes and/or specific indexed values that correspond to specific values for specific file attributes of files implicated by a storage operation, and may perform the storage operation on the identified files without the second set of executable instances loading, accessing, and/or otherwise analyzing the metadata of those and/or other stored files in between receiving and executing the storage operation.

Figure 1:
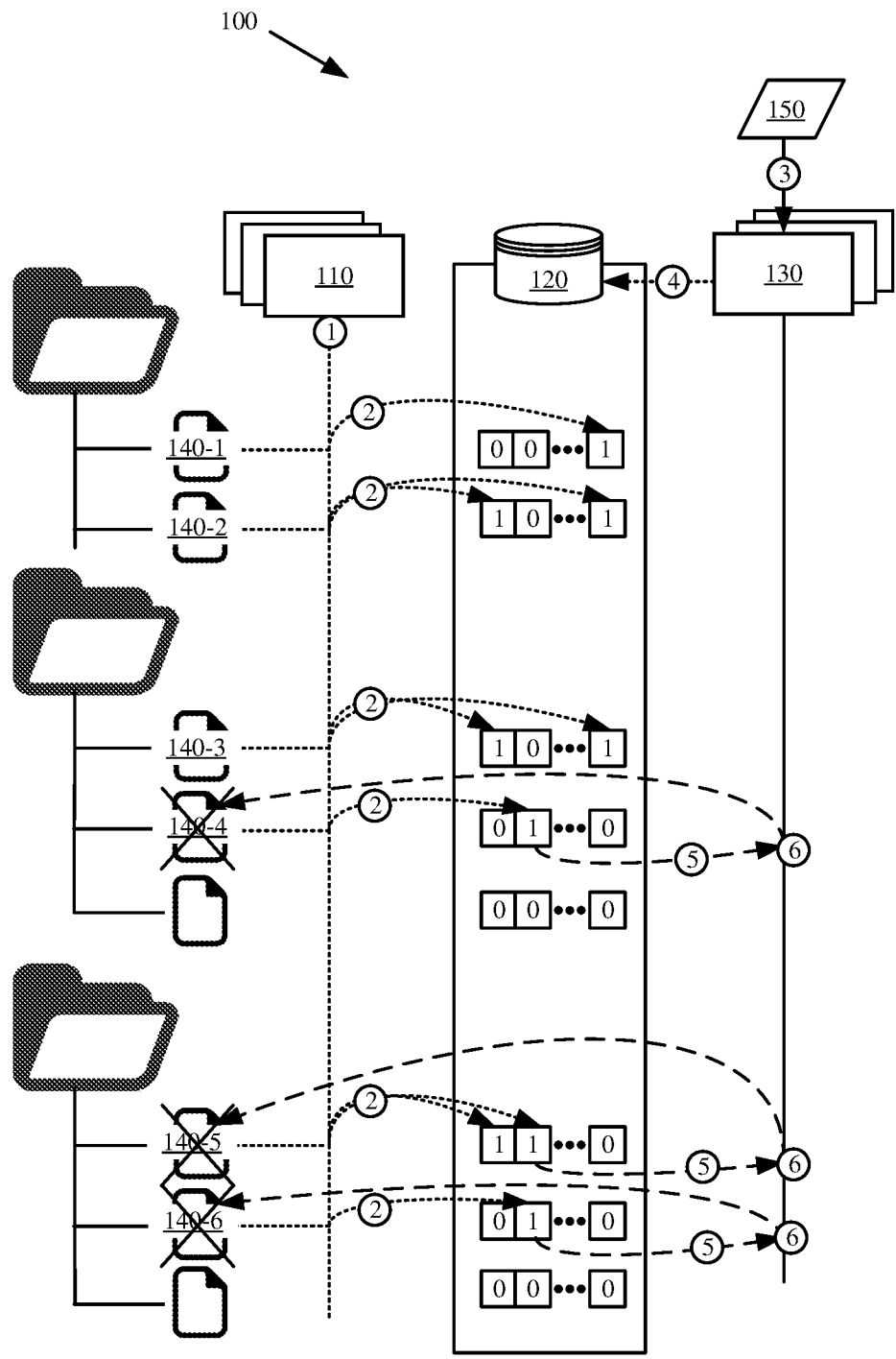
FIG. 1 illustrates example operation of a Multi-Threaded Indexed ("MTI") file system in accordance with some embodiments presented herein.

FIG. 1 illustrates example operation of MTI file system 100 in accordance with some embodiments presented herein. MTI file system 100 may control the storage, updating, removal, access, and/or other operations performed with respect to files that stored on one or more storage devices (e.g., magnetic disk, solid-state disk, memory, etc.).

MTI file system 100 may include first set of executable instances 110, database 120, and second set of executable instances 130. First set of executable instances 110, database 120, and second set of executable instances 130 may run independently and simultaneously in order to manage the files that are stored on the one or more storage devices.

Database 120 may organize and/or access entries based on one or more indexes. Each entry may correspond to a different stored file on a storage device that is managed by MTI file system 100. Each entry may be associated with a unique identifier and a set of indexes. The unique identifier for a particular entry may be used to locate and/or access a particular file represented by the particular entry, and may provide the path and filename of the particular file. The set of indexes associated with the particular entry may correspond to different indexed attributes of the particular file. The value of a particular index, in the set of indexes for a particular entry, may indicate a state or value of a particular file attribute of the particular file that is represented by the particular entry.

First set of executable instances 110 may include one or more processor threads and/or processes that can run independently and simultaneously to monitor different attributes of the stored files and/or to index those attributes in database 120. In some embodiments, a file attribute may be indexed when it has a certain value or when it has a value that has satisfied a certain threshold. For example, an index can have a 0 or 1 value, and the index may be set to 1 when the corresponding attribute represented by the index has a value that matches criteria for one or more operations (e.g., satisfies a condition for any purge, move, add, update, and/or other file system operation). MTI file system 100 may configure first set of executable instances 110 with the values, thresholds, and/or conditions with which to index certain file attributes with certain values in database 120 before initiating and/or executing first set of executable instances 110. As a specific example, MTI file system 100 may select files to purge based on their last file access time (e.g., select files with the oldest file access times). In this example, first set of executable instances 110 may map a last access time for a file that is less than 10 seconds to a first indexed value (e.g., 0), and may map a last access time that is greater than 10 seconds to a second indexed value (e.g., 1) in order to efficiently identify and remove any stored file that has not been accessed in the last 10 seconds.

The indexed attributes can include any file metadata parameter, file property, or value defining a file characteristic. For instance, the indexed attributes can include file size, file type, storage timestamp, time-to-live ("TTL"), last access time, number of times accessed, identifier for the file originator, metadata tags, access permissions, file encoding, checksum, and/or other characteristics of the file.

Each executable instance 110 may monitor and/or track a different attribute or a set of attributes. Each executable instance 110 may run at different times based on different intervals or different triggering conditions. For instance, first set of executable instances 110 may include a first indexing thread that runs every five seconds, and a second indexing thread that runs whenever a particular file attribute is changed for any of the stored files. During each execution interval, the first indexing thread may scan attributes of newly stored files or files that have been changed since a last execution interval. In some embodiments, the first indexing thread may query a write queue of MTI file system 100 to identify the new or changed files and to scan a desired subset of attributes of those files. In some embodiments, MTI file system 100 may tag or otherwise flag new or changed files to assist the first indexing thread in differentiating the new or changed files from unchanged files, and thereby reduce the number of files that are analyzed by each of the first set of executable instances 110.

As shown in FIG. 1, first set of executable instances 110 may scan (at 1) files 140-1, 140-2, 140-3, 140-4, 140-5, and 140-6 (herein sometimes collectively referred to as "files 140" or individually as "file 140") that are stored in different directories during a particular execution cycle of first set of executable instances 110. First set of executable instances 110 may scan files 140, and may not scan other files, during the particular execution cycle as a result of files 140 being newly created (e.g., newly stored on storage), having been modified, and/or having one or more attributes of interest.

First set of executable instances 110 may set (at 2) different indexes from a set of indexes that is associated with and/or used to track attributes of a scanned file in response to the file attributes of the scanned file having certain values, satisfying certain thresholds, and/or meeting other configured criteria monitored by first set of executable instances 110. For instance, first set of executable instances 110 may set (at 2) a first index for database 120 entry of file 140-2 based on the last access time of file 140-2 being older than 10 seconds, may not set a second index based on file 140-2 being of a specific type or size that does not satisfy a condition for setting the second index (e.g., set second index for video files and file 140-2 is an image file, or set second index for files greater than 100 megabytes ("Mb") in size and file 140-2 having a smaller size), and may set a last index based on the TTL of file 140-2 expiring.

In some embodiments, each instance of first set of instances 110 may independently update database 120 by setting a different index in the set of indexes of each entry. Each instance of first set of instances 110 may update database 120 after scanning a single file, a single directory, or completing an execution cycle and/or scanning files in multiple directories. In some embodiments, first set of instances 110 may provide index updates to a first process of database 120. The first process may then perform a batch updating of database 120 based on the indexes provided by each instance of first set of instances 110. In this manner, writes to database 120 are consolidated and performed at one time by one process, rather than by separate threads or executable instances 110, thereby eliminating the potential for simultaneously writes to the same index or same set of indexes by different threads or instances 110.

Second set of executable instances 130 may run independently of first set of executable instances 110. Second set of executable instances 130 may include one or more independent processor threads and/or processes that perform operations on the stored files based on the file attribute indexes in database 120. The operations can include purging (e.g., deletion), moving, compressing, updating, and/or other operations supported by MTI file system 100 and/or other file systems.

In some embodiments, MTI file system 100 may spawn a file management thread, as one instance of second set of executable instances 130, in response to receiving (at 3) file operation 150. File operation 150 may be issued by different applications, users, or remote devices that store, access, and remove files using MTI file system 100. File operation 150 may specify a directory path that leads to a leaf or terminating directory, or to a higher-level directory containing one or more subdirectories. File operation 150 may also specify a regular expression, wildcard, and/or other identifier for identifying one or more files that are targeted by file operation 150. In other words, file operation 150 may specify one identifier that targets one or more files in one or more directories.

Rather than scan the metadata of all files in the targeted directory path(s) in order to identify which files in those directories are targeted by file operation 150, the file management thread may map file operation 150 to one or more indexes that can be used to directly identify the targeted files. For instance, the file management thread may determine which file attributes are used to define file operation 150, may determine which indexes from database 120 correspond to the determined file attributes, and may query database 120 for files that have the implicated indexes set.

In FIG. 1, second set of executable instances 130 may determine that file operation 150 is defined based on a file attribute that is mapped to a second index of the set of indexes that is tracked for each file or entry in database 120. For instance, file operation 150 may request deletion of all files with file sizes greater than 500 Mb, and first set of executable instances 110 may set the second index to a value of 1 for each entry in database 120 that corresponds to a file with a file size greater than 500 Mb.

In any case, second set of executable instances 130 (e.g., the file management thread) may query (at 4) database 120 to identify entries with the second index, that is implicated by the file attribute of file operation 150, set to a particular value (e.g., set to a value of 1). Database 120 may return (at 5) identifiers for files 140-4, 140-5, and 140-6 in response to the query. The identifiers may be associated with each of the database entries that have the second set to the particular value. The identifiers may include a complete directory path and filename for each implicated file 140-4, 140-5, and 140-6.

Second set of executable instances 130 may execute (at 6) file operation 150 against each implicated file 140-4, 140-5, and 140-6. In FIG. 1, second set of executable instances 130 may purge (at 6) files 140-4, 140-5, and 140-6 from storage.

Purging files 140-4, 140-5, and 140-6 may involve the file management thread of second set of executable instances 130 generating three separate delete commands based on file operation 150 and the identifiers returned (at 5) in response to querying (at 4) database 120. Each specific delete command may specify the specific directory path and filename of one of files 140-4, 140-5, and 140-6. Second set of executable instances 130 may also update database 120 to remove the corresponding entry for each removed file 140-4, 140-5, and 140-6.

In this manner, MTI file system 100 may efficiently perform complex file operations that are specified using wildcards, regular expressions, and/or other parameters that do not directly target specific files. Specifically, MTI file system 100 may identify files targeted by a complex file operation from billions of stored files without having to scan the metadata and/or file attributes of those files upon receiving (at 3) the complex file operation. Instead, upon receiving (at 3) the complex file operation, second set of executable instances 130 may directly identify the targeted files by querying database 120 for entries with one or more indexes that have been already set.

Figure 2:
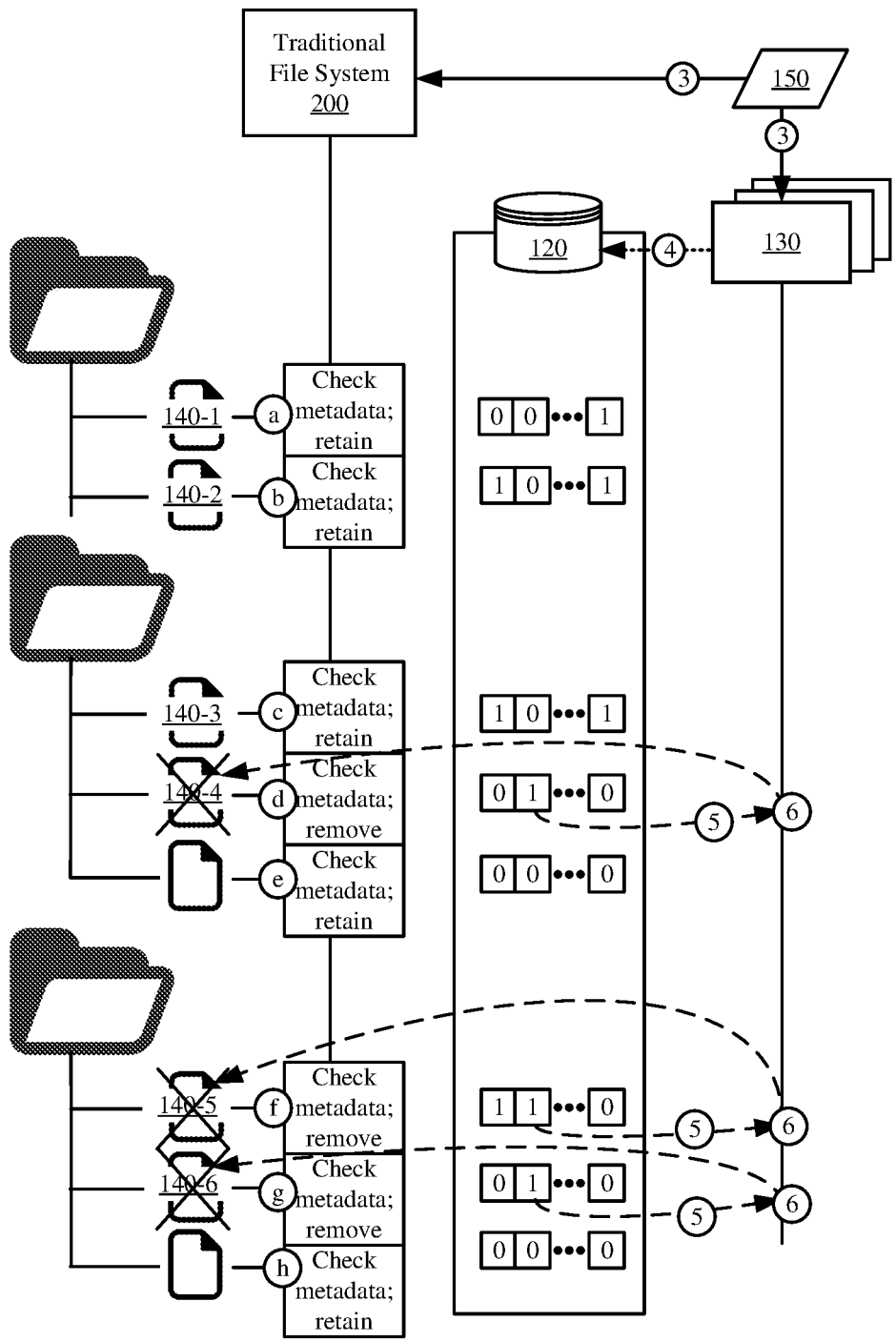
FIG. 2 illustrates advantages of executing complex file operations with the MTI file system relative to a traditional file system, in accordance with some embodiments presented herein.

FIG. 2 illustrates advantages of executing complex file operations with MTI file system 100 relative to traditional file system 200, in accordance with some embodiments presented herein. As shown in FIG. 2, when file operation 150 is issued (at 3) to MTI file system 100 and file operation 150 includes a wildcard, regular expression, and/or other parameters that do not directly identify which files are targeted by that file operation 150, second set of executable instances 130 may directly identify the targeted files based on the query (at 4) to database 120 for entries with the second index set to a value of 1, and the results returned (at 5) by database 120.

In contrast, when file operation 150 is issued (at 3) to traditional file system 200, traditional file system 200 has no direct means of identifying which files are targeted by file operation 150. Therefore, traditional file system 200 may traverse each directory path that is implicated by file operation 150, and may scan (at a-h) the metadata of each file in each traversed directory path to identify files 140-4, 140-5, and 140-6 with attributes that are implicated by file operation 150.

Accessing each directory in order to load and scan the metadata for each file upon receipt of file operation 150 by traditional file system 200 consumes significantly more resources and is a significantly slower operation that the single query (at 4) to database 120 for a table indexed based on the second index (e.g., entries with the second index set to a particular value). As a result, traditional file system 200 is slower than MTI file system 100 in executing complex file operation 150, especially when complex file operation 150 involves directories with millions or billions of files whose metadata is loaded and scanned. Moreover, MTI file system 100 executes complex file operation 150 with significantly lower overhead (e.g., memory, processor, etc.) than traditional file system 200, because MTI file system 100 avoids having to access each directory before loading and/or analyzing the metadata of each file in each of the traversed directories upon receiving (at 3) file operation 150. MTI file system 100 uses first set of executable instances 110 to analyze and index the metadata and/or file attributes of the stored files independently and before file operation 150 is received, thereby leaving second set of executable instances 10 with the much simpler and faster task of querying database 120 upon receiving (at 3) file operation 150.

MTI file system 100 may efficiently perform complex file operations against files in one or more specifically targeted directories or paths. For instance, second set of executable instances may modify the query that is made to database 120 to specify the one or more directories, that restrict the scope of file operation 150, as a query parameter in addition to the query parameter for entries that have the second index set to a value of 1. In this case, database 120 may execute the modified query against a set of entries for files located in the one or more directories and/or included subdirectories, and may return results for only a subset of entries from the set of entries that have the second index set to the desired value. The query and identification of files implicated by the file operation is not or is only minimally impacted when the file operation involves a directory with an irregular storage pattern (e.g., a directory storing millions of files), because MTI file system 100 avoids loading and scanning the metadata of the files in the directory in order to identify the implicated files. Instead, MTI file system 100 identifies the implicated files by querying database 120 for entries with a desired index.

In some embodiments, two separate queries may be made to database 120 to restrict file operation 150 to one or more specifically targeted directories or paths. A first query, as was shown in FIG. 1, may be made to identify all entries with the second index set to the value of 1, and a second query may be made to identify the set of entries for files in the one or more targeted directories and/or included subdirectories. The results from the two queries can be compared, and the targeted file operation may be performed against files identified from entries found in the results of both queries. In some embodiments, the first query may be made by a first instance of the second set of executable instances 130, the second query may be made by a second instance of the second set of executable instances 130, and the first and second instances may compare results to complete execution of file operation 150.

MTI file system 100 can scale to support other complex file operations, including multi-dimensional file operations, with minimal additional overhead using the indexing of file attributes. In particular, MTI file system 100 may identify files implicated by a multi-dimensional file operation with little more than a second query to database 120 or a single query that is directed to files with a specific combination of set indexes.

A multi-dimensional file operation may include a file operation that targets files based on two or more file attributes. In some embodiments, the multi-dimensional file operation may include a wildcard, regular expression, and/or other parameters that indirectly identify files based on a combination of two or more file attributes, or that indirectly identify different sets of files based on different attributes specified as part of the multi-dimensional file operation.

Multi-dimensional file operations provide administrators with greater control and/or granularity over how storage is allocated. Moreover, multi-dimensional file operations allow for more intelligent or sophisticated file management, whereby different criteria may be used to select different sets of files for the same file operation.

Figure 3:
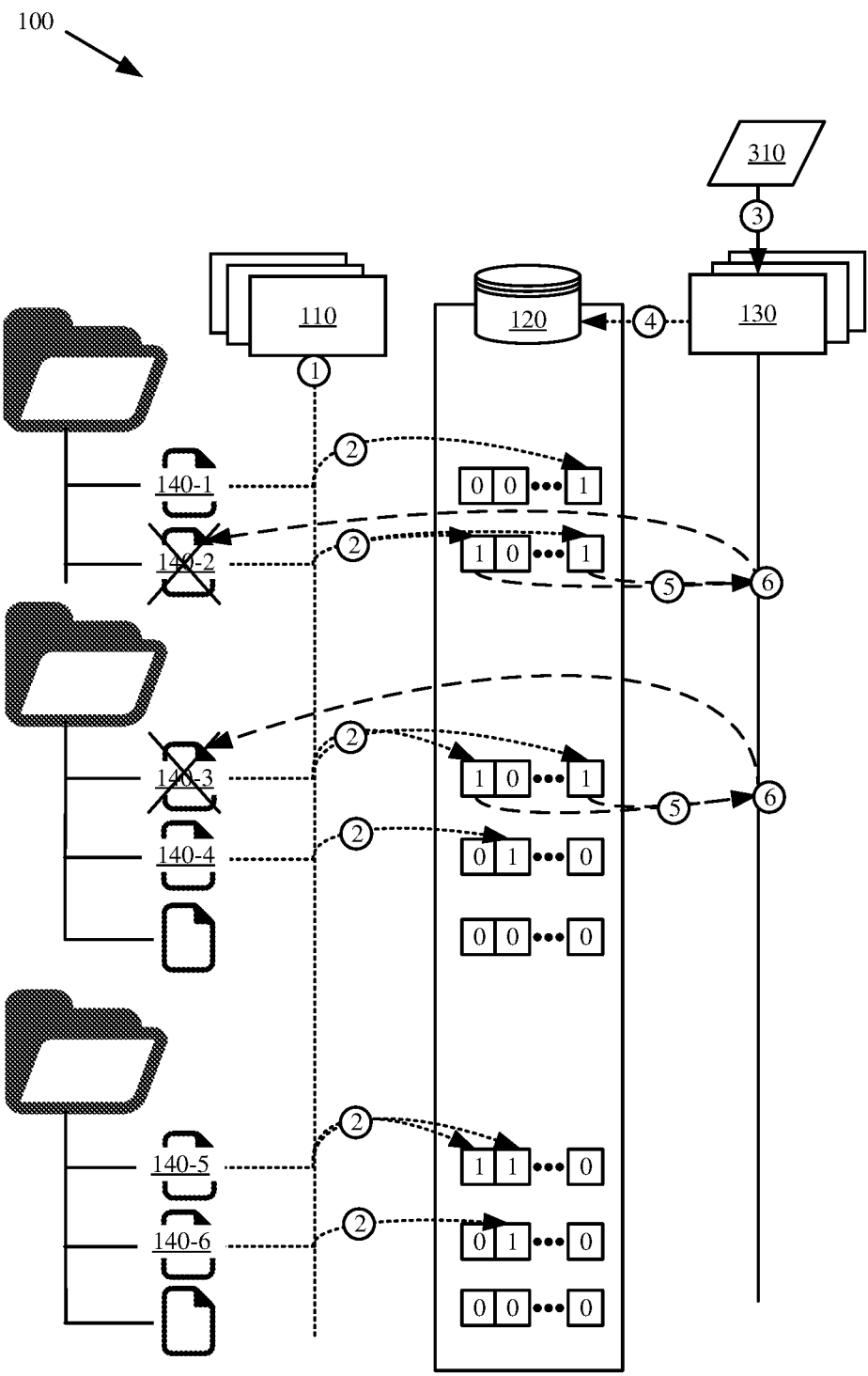
FIG. 3 illustrates an example of performing a multi-dimensional file operation using indexed file attributes in accordance with some embodiments presented herein.

FIG. 3 illustrates an example of performing a multi-dimensional file operation using the indexed file attributes in accordance with some embodiments presented herein. MTI file system 100 may invoke first set of executable instances 110 to track (at 1) changes or updates to different attributes of stored files by setting (at 2) different indexes for entries in database 120 that correspond to those files. MTI file system 100 may invoke second set of executable instances 130 to run independent of first set of executable instances 110. In particular, MTI file system 100 may invoke one or more of second set of executable instances 130 in response to receiving (at 3) multi-dimensional file operation 310. Multi-dimensional file operation 310 may include a file operation that is performed on files having a specific pair of file attributes. The specific pair of file attributes can correspond to any two distinct metadata characteristics or other characteristics of the stored files.

Second set of executable instances 130 may map the specific pair of file attributes, identified from multi-dimensional file operation 310, to first and last indexes in the set of indexes of each entry in database 120. For instance, multi-dimensional file operation 310 may specify a complex purge operation in which files may be purged from storage based on a last file access time that is greater than 1 minute or based on the file TTL expiring before the last access time reaches 1 minute. In this manner, some content providers can set a TTL to prevent their content from being cached or to cache their content for a short period of time, while other content providers can have their content be purged according to a different cache replacement policy.

In FIG. 3, first set of executable instances 110 may run (at 1) one or more times before MTI file system 100 receives (at 3) multi-dimensional file operation 310. During each execution iteration, one or more of first set of executable instances 110 may identify files with expired TTLs, and may set (at 2) the first index in the set of indexes with a particular value for database entries corresponding to the TTL expired files. To simplify the identification of TTL expired files, MTI file system 100 may store files with a TTL value, and first set of executable instances 110 may reduce the TTL value during each execution iteration by an elapsed amount of time since the last execution iteration, and may index (at 2) files with an expired TTL. During the same or different execution iteration, one or more of first set of executable instances 110 may identify files with last access times that are greater than 1 minute, and may set (at 2) the last index in the set of indexes with the particular value or another specific value for database entries corresponding to files with last access times greater than 1 minute.

Figure 4:
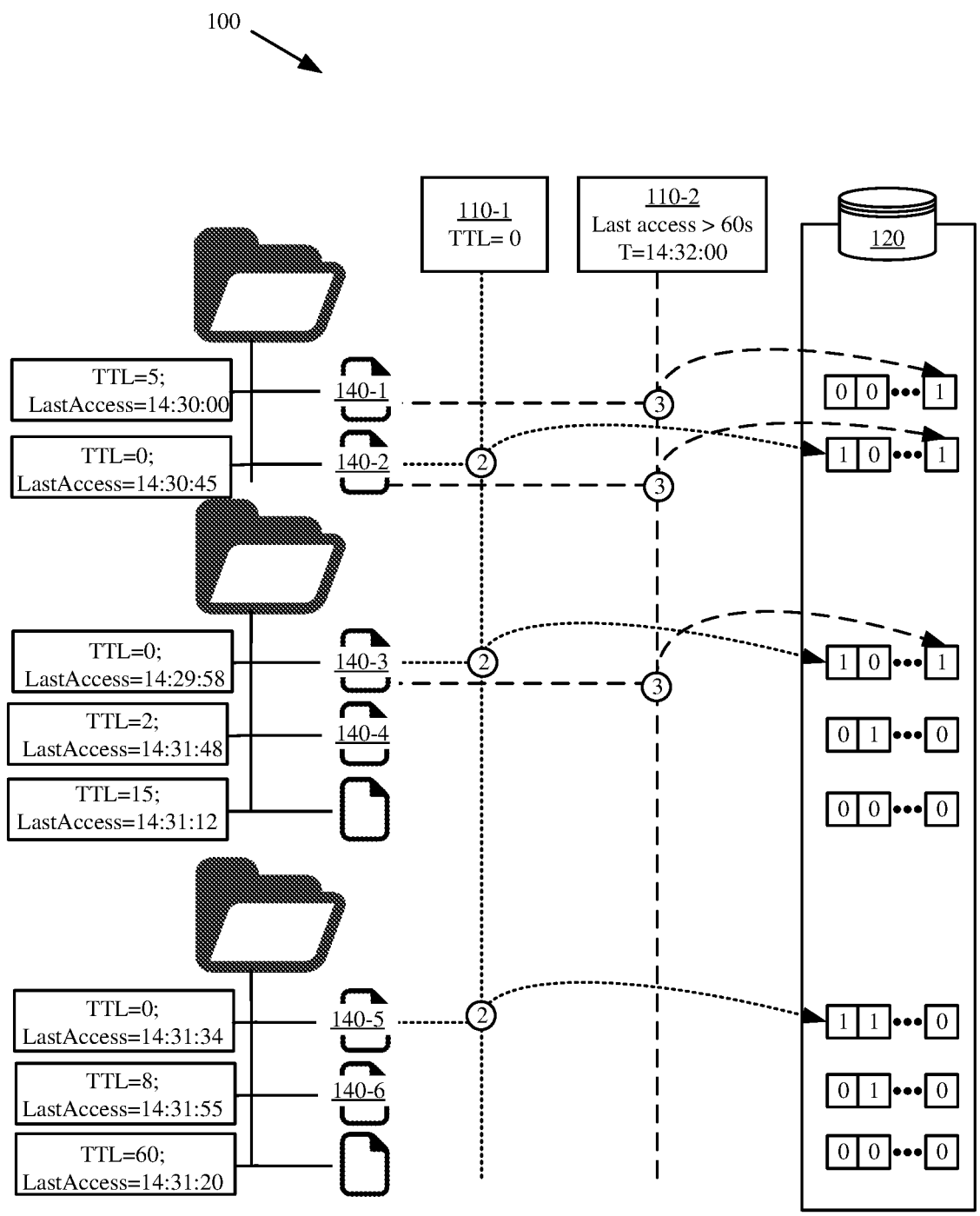
FIG. 4 illustrates an example of a first indexing thread and a second indexing thread running in parallel to set first and last indexes based on file time-to-live ("TTL") values and last access times.

FIG. 4 illustrates an example of first indexing thread 110-1 and second indexing thread 110-2 of first set of executable instances 110 running in parallel to set first and last indexes based on file TTL values and last access times. In particular, first indexing thread 110-1 may detect files 140-1, 140-2, and 140-3 with expired TTL values, and may set (at 2) the first index in entries of database 120 that are created for files 140-1, 140-2, and 140-3. Second indexing thread 110-2 may set (at 3) the last index for entries corresponding to files that have last access times greater than 1 minute.

When using a Least Recently Used ("LRU") cache replacement policy instead of a threshold last access time (e.g., files with last access times greater than 1 minute), MTI file system 100 may store files with a timestamp that indicates when each file was stored or last accessed, and first set of executable instances 110 may store an increasing value in a particular index based on increasing file timestamps. Database 120 can sort the entries based on the value of the particular index. The entries with the particular index set to the greatest values correspond to the least recently accessed file. Database 120 may provide identifiers for the least recently accessed files such that the LRU cache replacement policy can be effectuated via a simple sorting of the particular index.

With reference back to FIG. 3 and in response to receiving (at 3) multi-dimensional file operation 310, second set of executable instances 130 may query (at 4) database 120 for files with TTL parameters and last access times that satisfy conditions of multi-dimensional file operation 310. In FIG. 3, files with expired TTLs may be identified by the first index of the set of indexes for entries corresponding to the those files having a set value of 1, and files with last access times greater than 1 minute may be identified by the last index of the set of indexes for entries corresponding to those files having a set value of 1. In some embodiments, second set of executable instances 130 may submit (at 4) a single query to database 120 for entries that have both the first and last indexes set to a value of 1. In some embodiments, a first file management thread of second set of executable instances 130 may query (at 4) database 120 for files that have the first index set, a second file management thread of second set of executable instances 130 may query (at 4) database 120 for files that have the last index set, and the first and second file management threads may compare the results of their respective queries to identify identifiers for the same files 140-2 and 140-3 returned in response to each query. In some other embodiments, second set of executable instances 130 may rely on database 120 to map the file attributes that are specified as part of multi-dimensional file operation 310. For instance, second set of executable instances 130 may issue (at 4) a query for entries that have expired TTL parameters and last access times that meet the conditions of multi-dimensional file operation 310, and database 120 may translate the query to identify files with first and last indexes having a value of 1.

Database 120 may respond (at 5) by searching for entries and/or files that have the first and last indexes set. Here again, targeted files 140-2 and 140-3 are identified without traversing the different directory paths and/or scanning the metadata of the files in each traversed directory path upon or after receiving (at 3) multi-dimensional file operation 310. Database 120 can respond to the query or queries from second set of executable instances 130 significantly faster and with significantly less resource overhead since finding database entries with two set indexes requires significantly fewer processing, memory, and/or other resources than loading and scanning metadata for every single stored file in the traversed set of directories.

Database 120 may provide (at 5) second set of executable instances 130 with identifiers for database entries having the matching set indexes (e.g., first and last indexes set with a particular value). The identifiers may directly identify the storage path and name for implicated files 140-2 and 140-3 that have the file attributes with values targeted by multi-dimensional file operation 310. Second set of executable instances 130 may purge (at 6) files 140-2 and 140-3 by issuing delete commands that are directed to the returned identifiers, and may further remove the corresponding entries for files 140-2 and 140-3 from database 120.

MTI file system 100 may dynamically configure first set of executable instances 110 and second set of executable instances 130 with instructions, attributes, thresholds, computations, and/or actions to perform during each execution iteration. The configuration of executable instances 110 and 130 allows MTI file system 100 to scale and to support new file operations and/or file management techniques, and different complexities associated with each.

Figure 5:
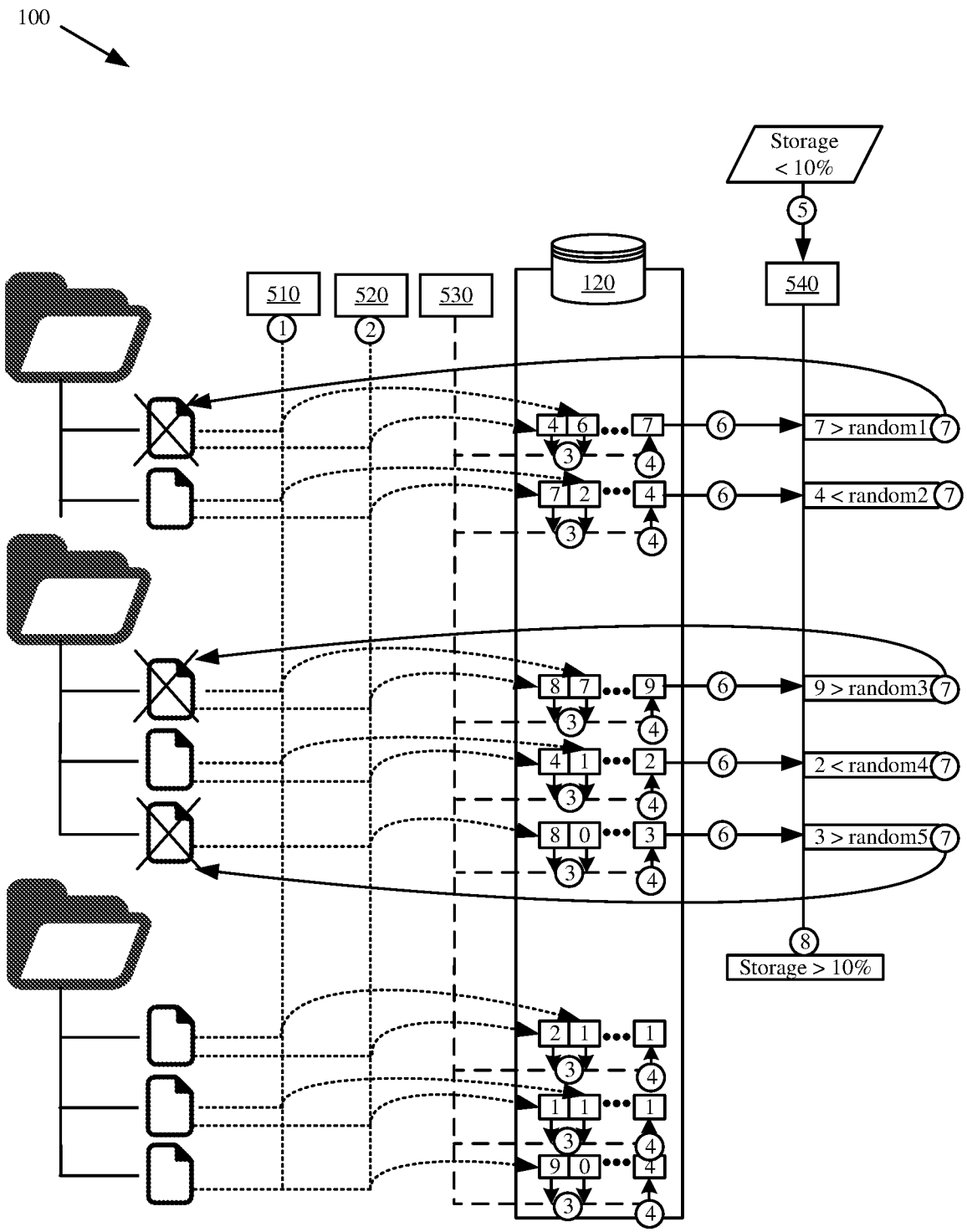
FIG. 5 illustrates an example of adapting the MTI file system to implement a probabilistic cache replacement policy in accordance with some embodiments presented herein.

FIG. 5 illustrates an example of adapting MTI file system 100 to implement a probabilistic cache replacement policy in accordance with some embodiments presented herein. The probabilistic cache replacement policy may involve scoring one or more file attributes based on their values, and generating a probability with which a stored file will be removed from storage based on the file attribute scores.

As shown in FIG. 5, MTI file system 100 may execute first indexing thread 510, second indexing thread 520, and third indexing thread 530 as first set of executable instances 110. First indexing thread 510 may generate (at 1) a first set of scores for a first file attribute, and second indexing thread 520 may generate (at 2) a second set of scores for a different second file attribute. For instance, MTI file system 100 may configure first indexing thread 510 with a first scoring function that generates (at 1) higher scores for larger files and that generates (at 2) lower scores for smaller files to prioritize the retention of smaller files in cache and the removal of larger files from cache. MTI file system 100 may configure second indexing thread 520 with a different second scoring function that generates (at 2) higher scores for content of a content provider that has a large cache footprint (e.g., total size of all content of the content provider currently in cache is larger than total size of all content from other content providers) and that generates (at 2) lower scores for content of a content provider that has a small cache footprint. The second scoring function may seek to ensure that no content provider consumes a disproportionate amount of the overall cache by prioritizing the removal of content of a content provider with a large cache footprint.

First indexing thread 510 and second indexing thread 520 may run independently and may enter the first and second scores for different files to the corresponding entries for those files in database 120. For instance, MTI file system 100 may execute first indexing thread 510 after a specified number of write file operations (e.g., new files being written to storage), and may execute second indexing thread 520 less frequently than first indexing thread 510 (e.g., on an hourly basis) because of the additional processing overhead for computing the cache footprint of different content providers.

MTI file system 100 may configure third indexing thread 530 to periodically compute and/or update an eviction probability for each entry based on the first and second scores entered in database 120. Accordingly, third indexing thread 530 may read (at 3) directly from and write (at 4) directly to database 120 without traversing the different directories and without scanning the file attributes and/or metadata of the stored files. Third indexing thread 530 may be configured with a third scoring function that produces (at 4) the eviction probability by providing different weights to the first and second scores.

MTI file system 100 may execute (at 5) file management thread 540 as one of second set of executable instances 130 when storage utilization exceeds a threshold, when there is a sufficient amount of available processor cycles, periodically, and/or based on other triggering events. File management thread 540 may select an entry from database 120, may obtain (at 6) the eviction probability associated with the selected entry, and may determine (at 7) to retain or evict the file represented by the selected entry based on the eviction probability. The entry selection may be randomized, sequential (e.g., round robin), or focused towards entries with eviction probabilities greater than a threshold value. In some embodiments, the eviction probability may be a value between 0 and 10. File management thread 540 may generate a random number, and may remove (at 7) a file when the generated random number is smaller than the eviction probability. File management thread 540 may select a next entry, generate a new random number, and make (at 7) the eviction determination until a certain amount of storage is free (at 8), a certain number of entries have been examined, or overall processor utilization exceeds a threshold amount.

FIG. 5 is an example that demonstrates how MTI file system 100 can be adapted to efficiently perform complex file operations that involve computations on file attributes in order to determine which files are implicated by the file operations. As shown, file management thread 540 can perform the complex purge operations and directly identify which files to delete by querying database 120 for the eviction probability. The independent and/or parallel execution of indexing threads 510, 520, and 530 allow file management thread 540 to perform the complex purge operations without having to scan the metadata or file attributes of the stored files, without having to compute the file attribute scores, and without having to compute the eviction probability when the storage utilization exceeds the threshold, when there is a sufficient amount of available processor cycles, periodically, or based on other triggering events. The metadata scanning, file attribute scoring, and eviction probability computations are performed in advance by indexing threads 510, 520, and 530, with the results being stored in database 120 for file management thread 540 to access when file management thread 540 runs.

Figure 6:
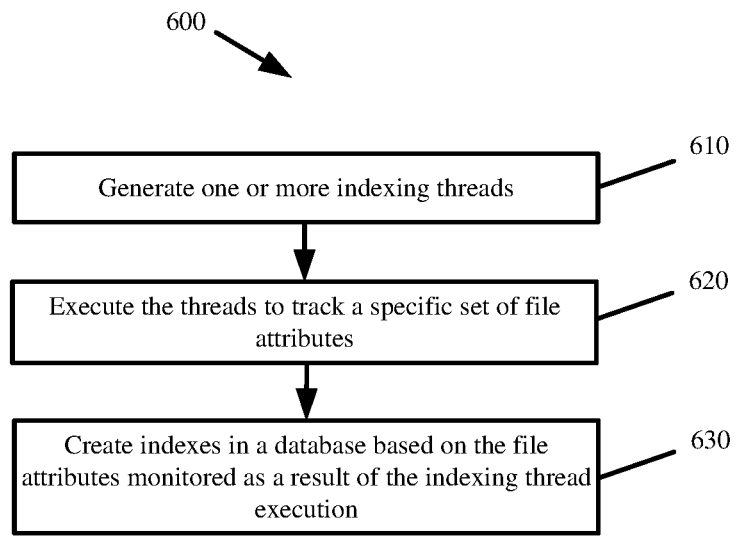
FIG. 6 presents a process for performing the indexing in support of the efficient file operation execution according to some embodiments presented herein.

FIG. 6 presents a process 600 for performing the indexing in support of the efficient file operation execution according to some embodiments presented herein. Process 600 may be implemented by MTI file system 100 and/or first set of executable instances 110 being dynamically created and configured by MTI file system 100.

Process 600 may include generating (at 610) one or more indexing threads for first set of executable instances 110. Generating the one or more indexing threads may include initiating a new thread and configuring that thread with executable parameters. The executable parameters may define when and how often the thread runs, which one or more file attributes are to be monitored by the thread, computations to perform on the monitored file attributes, and/or indexing rules for the thread. The indexing rules may include a threshold value that specifies which one or more values for a particular file attribute cause the thread to set a corresponding index for that particular file attribute with a specific value. For instance, a thread may be configured to set an index for files of a particular file type (e.g., set a particular index to 1 upon detecting an image file).

In some embodiments, MTI file system 100 may generate (at 610) a different indexing thread for each file attribute that is monitored and/or used to define supported file operations. For instance, MTI file system 100 may be configured to perform a cache replacement policy that uses file size and file type to select files to remove, and so MTI file system 100 may generate (at 610) indexing threads that track and/or index the file size and file type attributes of stored files. In some embodiments, MTI file system 100 may generate (at 610) one or more indexing threads to detect files with new or changed file attributes, and another indexing thread or process to interface with database 120 based on output generated by the one or more indexing threads.

Process 600 may include executing (at 620) each of the generated indexing threads. The indexing threads may monitor a configured set of file attributes. In some embodiments, some or all the indexing threads may execute periodically or at set intervals.

During each execution iteration, the indexing threads may scan all files in all directory paths for new or changed file attributes. Alternatively, MTI file system 100 may tag or flag newly stored files and/or changed files so that during the next indexing thread execution iteration, the indexing threads may scan only the newly stored files and/or changed files for new or changed file attributes. The indexing threads can also execute against files that have been entered in a write queue of MTI file system 100, wherein the write queue identifies the files that are newly written to storage or that are being changed.

In some embodiments, some or all the indexing threads may execute in response to a triggering event. A triggering event may include detecting when a new file is stored onto storage, and executing the indexing threads against the newly stored file to generate indexes based on the monitored attributes of that file. Additionally, or alternatively, a triggering event may include detecting when a file is changed or modified, and running the indexing threads against the changed or modified file in order to determine if the change or modification caused a change to a monitored file attribute.

The indexing threads can execute (at 620) independently and simultaneously. The indexing threads can execute (at 620) without interrupting other functions, threads, processes, and/or operations of the system or device on which MTI file system 100 runs. Moreover, the indexing threads can execute (at 620) in advance of MTI file system 100 receiving or performing any file operations.

Process 600 may include creating (at 630) indexes in database 120 based on the file attributes that are tracked as a result of the indexing thread execution. In some embodiments, the indexing threads may directly interface with database 120 in order to create the indexes when the indexing threads detect new or changed attributes or at the end of an execution iteration. In some embodiments, the indexing threads indirectly interface with database 120 by providing information about new or changed file attributes to a process, and the process, on behalf of the different executing indexing threads, may create (at 630) the indexes in database 120.

Index creation may include accessing a set of indexes associated with a particular entry in database 120 for a particular file whose attributes are being indexed. An indexing thread may access the particular entry using a unique file identifier of the particular file. The file identifier may be formed from one or more of the particular file path, name, checksum, hash of the particular attributes, and/or other values associated with the particular file. In other words, each entry in database 120 may be directly linked or mapped to a different file.

Index creation may include setting a particular index in the set of indexes for the particular file based on a mapping between a tracked file attribute to the particular index. In some embodiments, the indexing threads of first set of executable instances 110, database 120, and/or file management threads of second set of executable instances 130 may be configured with the attribute-to-index mapping.

Index creation may include setting a value for the particular index to indicate that the corresponding file attribute has reached a threshold value or condition where one or more file operations may be performed against the file. For instance, MTI file system 100 may execute different cache replacement policies (e.g., LRU, TTL expiration, size-based removal, probabilistic purging, etc.), and one or more of the indexes may store a value for when a file becomes a candidate for removal for one or more of the cache replacement policies. Database 120 supports one or more values for each index. The different values can specify different conditions or different classifications of file attributes. For instance, an index may be set with a first value to indicate files of a first type (e.g., video files), a second value to indicate files of a second type (e.g., image files), a third value to indicate files of a third type (e.g., text files), etc. In some embodiments, a single index can be used to represent the state of multiple file attributes. For instance, indexing threads may set a value for a particular index in response to detecting a file that is larger than a threshold size, that has remained in cache for longer than a threshold amount of time, and that is of a first file type. In some embodiments, an index can be used to store a value that is derived or computed from one or more file attribute values. For instance, the indexing threads may use scoring functions to compute values in the same range for file attributes that have different values or value ranges.

The creation (at 630) of indexes in database 120 allows database 120 to efficiently track the desired attributes of different files. For instance, the indexes may track attribute state rather than the actual attribute value from which the attribute state may be derived. Moreover, database 120 can be efficiently queried and can quickly generate tables based on the indexes to identify files with the same one or more indexes (e.g., attribute states), thereby allowing for efficient execution of file operations that use wildcards or regular expressions to select a subset of files.

Figure 7:
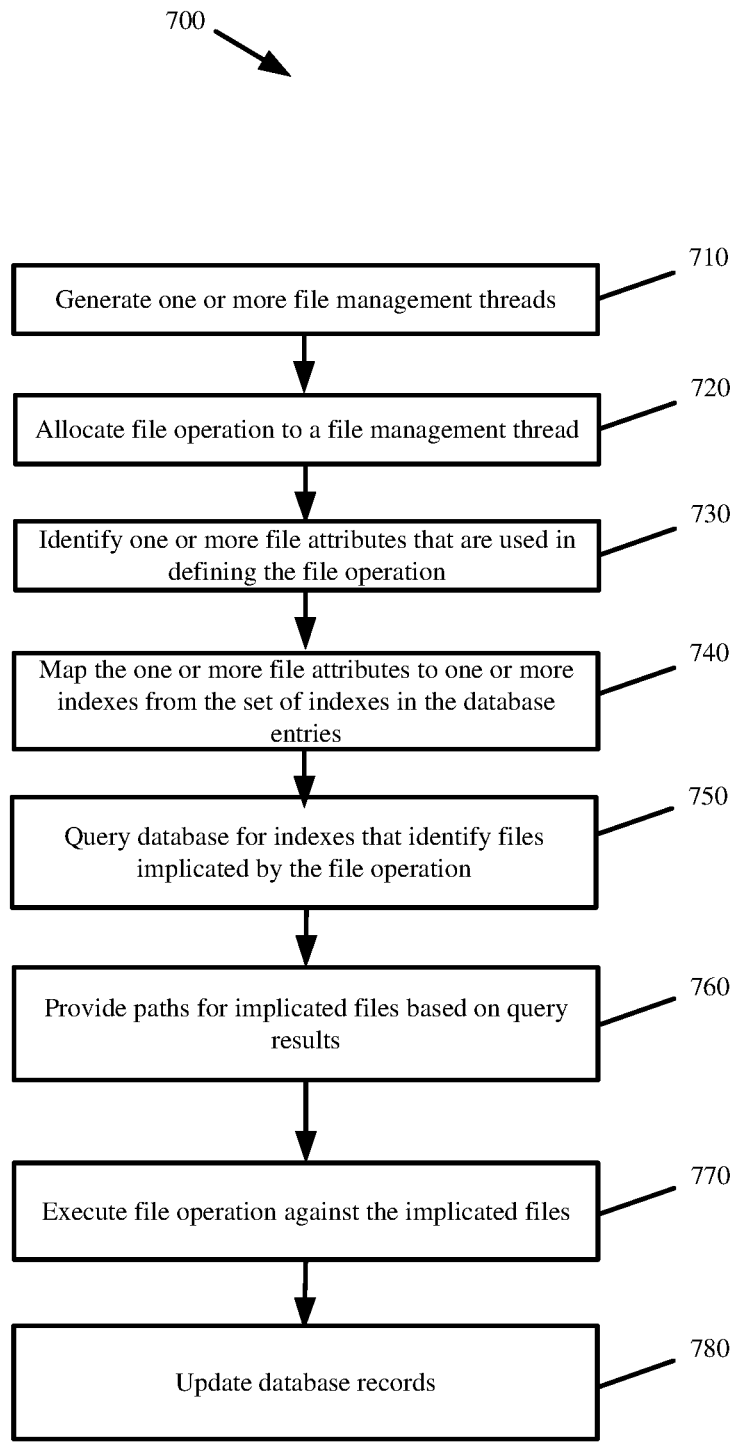
FIG. 7 presents a process for using indexes from a database to directly identify different sets of files for different file operations indirectly targeting those different sets of files.

FIG. 7 presents a process 700 for using indexes from database 120 to directly identify different sets of files for different file operations indirectly targeting those different sets of files. Process 700 may be implemented by MTI file system 100 and/or second set of executable instances 130 being dynamically created and configured by MTI file system 100 in response to receiving a file operation. Process 700 may run in parallel or at different times than indexing process 600 described above. In any case, process 700 runs independent of indexing process 600.

Process 700 may include generating (at 710) one or more file management threads in response to incoming file operations. Alternatively, process 700 may generate (at 710) the one or more file management threads prior receiving a file operation, and may configure a file management thread to execute a file operation upon receiving that file operation. MTI file system 100 may terminate a file management thread, or may allocate a new file operation to a file management thread, after a previously allocated file operation is completed by that file management thread.

Process 700 may include allocating (at 720) a pending file operation to a file management thread. The file operation may be originated by different applications, users, or devices that remotely access files from MTI file system 100. The file operation may include writing, reading, moving, deleting, modifying, and/or other actions involving one or more files. The file operation may be a complex operation that does not directly identify (e.g., with a directory path and filename) any one or more files that the file operation applies to. Instead, the complex operation may indirectly implicate different files in the same or different directories using a wildcard, regular expression, and/or other expression that indirectly identifies one or more files based on different file attributes, paths, name expressions, or combinations thereof.

To execute the allocated file operation, process 700 may include analyzing the file operation, and identifying (at 730) one or more file attributes that are used in defining the file operation. For instance, each file operation may specify a command (e.g., write, read, delete, move, etc.) and one or more identifiers for one or more files that are targeted by the command. The file operation identifiers may include a wildcard expression, regular expression, and/or other expression that indirectly identifies one or more files based on different file attributes, paths, name expressions, or combinations thereof. For instance, the command may include a delete operation, and the one or more identifiers may specify files that have expired TTL values, that are of a particular type, and that have been accessed less than 100 times in a specified period of time.

Process 700 may include mapping (at 740) the file attributes, that are identified from the file operation identifiers, to one or more indexes from the set of indexes in the database entries that are used in tracking the identified file attributes. The file management thread may be configured with a file attribute-to-index mapping, or may receive the mapping from MTI file system 100.

Process 700 may include querying (at 750) database 120 based on the attributes-to-index mapping. In particular, the file management thread may query (at 750) database 120 for entries with a mapped subset of indexes set to values that match or satisfy the values or conditions defined for the file operation. In some embodiments, the file management thread may issue the query based on the identified file attributes of the file operation, and database 120 may map the file attribute query to specific indexes.

Database 120 may determine which entries have indexes that satisfy the query. In some embodiments, the query can be completed via a sorting of entries based on the desired indexes or by generating an internal table that includes entries with indexes having set values that match or satisfy the query. In any case, the query is completed and the targeted entries are found based on the tracked indexes. The targeted entries correspond to the files that are implicated by the file operation. Each matching entry may provide a path and filename for at least one implicated file. Accordingly, in response to the query, database 120 may provide (at 760) the file management thread with the paths and filenames for each implicated file. Here again, the actions by which the file management thread identifies the files implicated by the file operation, after being tasked with execution of the file operation (e.g., after receiving or being allocated the file operation), include querying the database for entries with specific indexes. The file management thread does not traverse different directories and does not scan the metadata of stored files for any attributes upon being tasked with execution of the file operation.

Process 700 may include executing (at 770) the file operation against the implicated files. The file management thread can directly target the implicated files in one or more directories based on the query results. As noted above, the query results may provide a list of entries for files that satisfy the file operation criteria, and each entry is associated with a direct path and filename for an implicated file. Accordingly, the file management thread may invoke the command of the file operation against each implicated file by issuing the same command to the path and filename that is associated with each entry in the list of entries.

Process 700 may include updating (at 780) database 120 in response to successfully executing (at 780) the file operation. The file management thread may update (at 780) database 120 when execution (at 770) of the file operation causes a change to the targeted files. For instance, the updating (at 780) may include removing an entry (e.g., the set of indexes stored for that entry) when execution (at 770) of the file operation involves deleting a file that is represented by the entry. The updating (at 780) may also include changing values for one or more indexes when the corresponding attributes of a file are changed as a result of executing (at 770) the file operation. In some embodiments, process 700 may omit updating (at 780) database 780, and may instead rely on a subsequent execution iteration of the indexing threads of process 600 to update the entries for any files that were changed as a result of the file management thread executing (at 770) the file operation.

MTI file system 100 may reduce the time it takes to identify files implicated by a file operation based on the indexed identification disclosed above. In some embodiments, MTI file system 100 may perform sharding for directories that contain a large number of files (e.g., millions of files in a single directory) in order to reduce the time to access files in those directories.

Directory sharding may include identifying a source directory in which the number of stored files exceeds a threshold number, redistributing the files from the source directory across multiple internal subdirectories, and providing a mapping between the source directory and the internal subdirectories. The sharding reduces the total number of files that are stored in a directory, which in turn reduces the overhead and time for MTI file system 100 to access specific files.

For instance, the redistribution of files from a large source directory to smaller subdirectories may accelerate the indexing operation by first set of executable instances 110. The smaller subdirectories reduce the metadata that is loaded into memory at any given time when traversing each subdirectory in order to scan the metadata of the files stored in that subdirectory for indexing purposes. The indexing of each subdirectory occurs with minimal overhead and delay, thereby allowing the indexing of all subdirectories to occur with minimal overhead and delay. Conversely, indexing all files from the large source directory could place gigabytes worth of metadata into memory which in turn can degrade indexing performance and/or performance of other functions or services that requires memory resources.

Similarly, the redistribution of files from the large source directory to smaller subdirectories may accelerate the file operation execution by second set of executable instances 130. The smaller subdirectories allow second set of executable instances 130 to locate a desired file and execute a file operation on the desired file more quickly and with less overhead than if locating the desired file and executing the file operation on the desired file in a directory with many more files.

Figure 8:
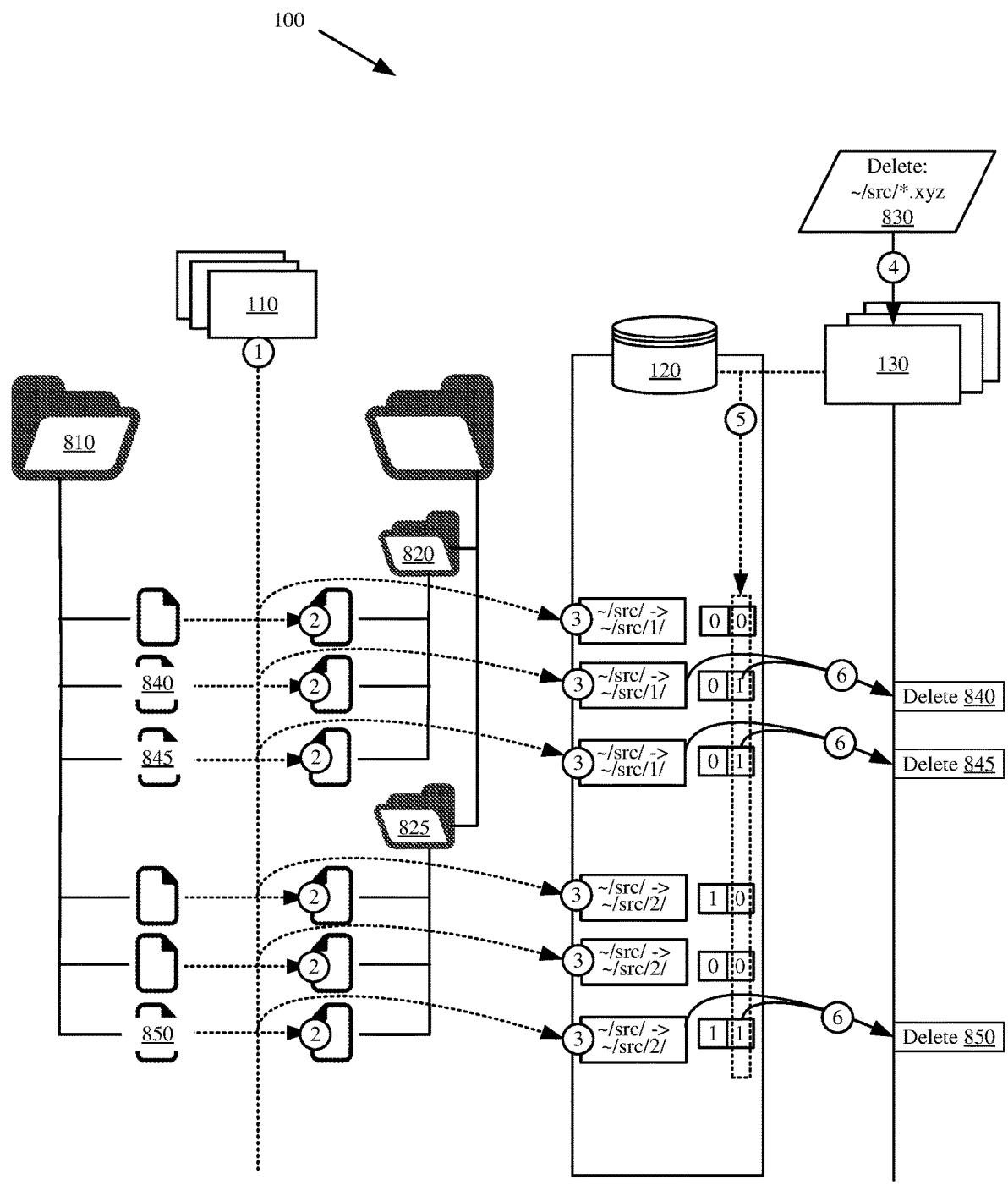
FIG. 8 illustrates an example of implementing directory sharding with the MTI file system in accordance with some embodiments.

The directory sharding may be implemented using first set of executable instances 110, database 120, and second set of executable instances 130 of MTI file system 100. FIG. 8 illustrates an example of implementing directory sharding with MTI file system 100 in accordance with some embodiments.

A first instance of first set of executable instances 110 may detect source directory 810 with an irregular storage pattern. The irregular storage pattern may include a directory that stores more than a threshold number of files (e.g., 1 million files) in source directory 810. The first instance may redistribute (at 2) the files from source directory 810 into different subdirectories 820 and 825.

The first instance may create (at 3) a mapping in database 120 for each entry that is created for a corresponding redistributed file. The mapping may update the entry identifier providing the file location. In particular, the mapping may associate the source directory path to the path of the subdirectory where the file is moved.

Once the redistribution (at 2) and mapping (at 3) are complete, first set of executable instances 110 can traverse the subdirectories to index one or more file attributes with less overhead and/or in less time than when performing the indexing via a single traversal that involves scanning the metadata of all files in source directory 810.

After or in parallel with the redistribution (at 2) and mapping (at 3), MTI file system 100 may receive and allocate (at 4) file operation 830 to a file management thread of second set of instances 130. File operation 830 may specify a command to delete files from the source directory based on a particular indexed attribute. The file management thread may query (at 5) database 120 for entries that have the particular indexed attribute set.

In response to the query (at 5), database 120 may determine that entries for files 840, 845, and 850 have the particular indexed attribute set (e.g., set to a value of 1 or some range of values). Files 840, 845, and 850 were originally stored to source directory 810. Accordingly, the entries for files 840, 845, and 850 may include a mapping that provides the identifiers that include the redistributed subdirectories where respective files 840, 845, and 850 are now stored. Database 120 may provide (at 6) the identifiers to the file management thread. The file management thread may execute the file operation by issuing the file operation command to each returned identifier, wherein each identifier may specify the path including the redirected subdirectory and the filename for one of files 840, 845, and 850.

Figure 9:
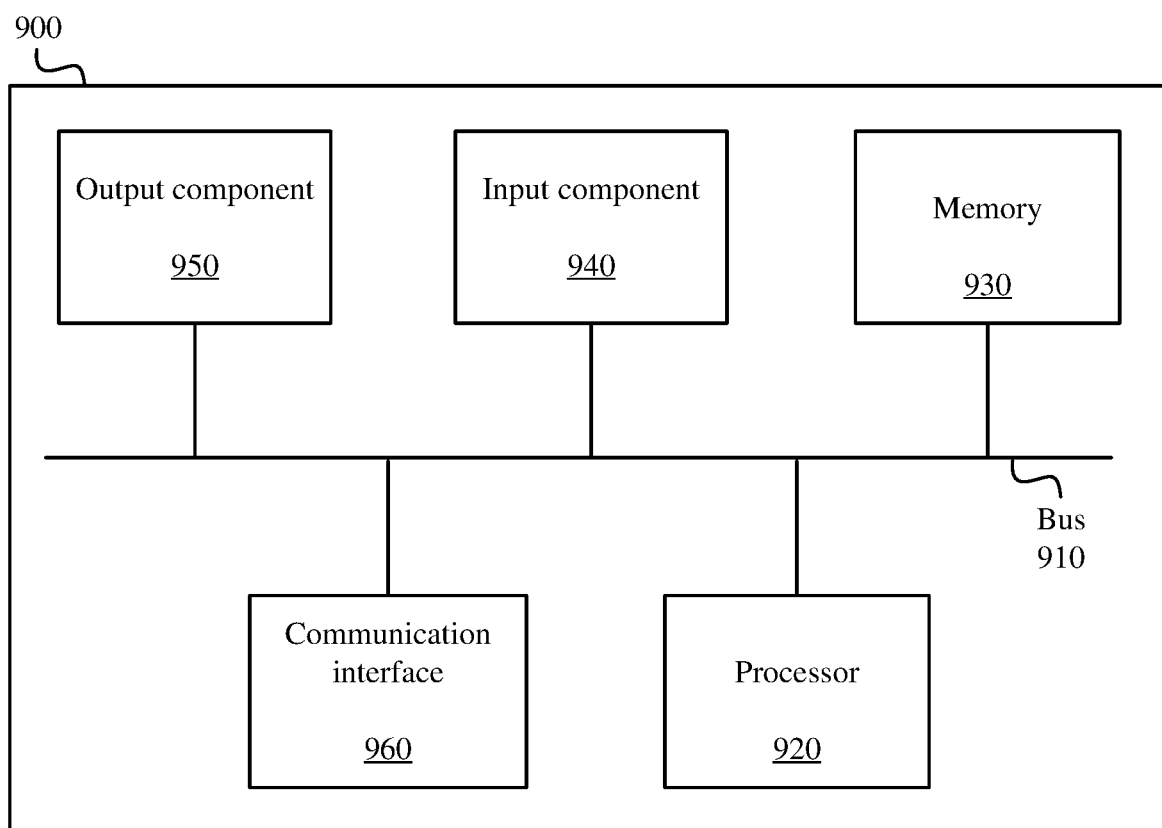
FIG. 9 illustrates example components of one or more devices, according to one or more embodiments described herein.

FIG. 9 is a diagram of example components of device 900. Device 900 may be used to implement one or more of the devices or systems described above (e.g., MTI file system 100). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, controller 105 may execute as part of a load balancer, PoP gateway router, or request director. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   providing a file system that stores a plurality of files to at least one storage device and that creates an entry in a database for each file of the plurality of files, wherein each entry comprises an identifier that identifies a storage location of a different file on the at least one storage device;
   tracking, by operation of the file system, at least one attribute from a set of the plurality of files based on the file system setting a particular index in each entry of a set of entries created in the database for the set of files;
   receiving a file operation at the file system;
   querying, by the file system, the database for a subset of the set of entries having the particular index set to one or more values that satisfy a condition of the file operation, wherein the condition is defined using the at least one attribute; and
   performing, by the file system, the file operation against a subset of the set of files that is identified on the at least one storage device from the identifier associated with each entry of the subset of entries, and wherein performing the file operation comprises modifying the subset of files on the at least one storage device according to the file operation.

2. The method of claim 1 further comprising:
   generating a first set of executable instances and an independently executing second set of executable instances within the file system;
   setting the particular index in response to a first executable instance of the first set of executable instances running at a first interval or in response to a first set of events, wherein the particular index is a first index;

setting a second index in one or more of the set of entries in response to a second executable instance of the first set of executable instances running at a second interval, that is different than the first interval, or in response to a second set of events, that is different than the first set of events; and wherein performing the file operation comprises:
initiating execution of the second set of executable instances in response to receiving the file operation;
mapping the condition from the file operation to the particular index; and
selecting the subset of files based on results of said querying and without inspecting metadata of the set of files stored on the at least one storage device.

3. The method of claim 1,
wherein said tracking comprises scanning metadata of the set of files, wherein the metadata comprises the at least one attribute; and
wherein said querying comprises selecting the subset of files based on the subset of entries identified from said querying independently of said tracking or said scanning.

4. The method of claim 1,
wherein said tracking is performed by execution of a first thread or process of the file system, and
wherein said querying and said performing is performed by execution of at least a second thread or process of the file system that runs simultaneously with the first thread or process.

5. The method of claim 1 further comprising:
scanning the at least one file attribute of new or modified files from the set of files periodically with a first set of executable threads of the file system; and
setting, by operation of the first set of executable threads, the particular index for an entry of a particular file in response to detecting the particular file in the set of files with the at least one attribute having one or more specified values.

6. The method of claim 5 further comprising:
generating at least one executable thread from a second set of executable threads of the file system that execute independently of the first set of executable threads in response to receiving the file operation; and
determining, by operation of the at least one executable thread of the second set of executable threads, the subset of files implicated by the file operation based on indexes in the database.

7. The method of claim 5, wherein said setting the particular index for the particular file comprises:
updating, by operation of a first executable thread of the first set of executable threads, a value of the particular index for the entry of the particular file in response to the detecting that the particular file has a first attribute with a first value; and
updating, by operation of a second executable thread of the first set of executable threads, a value of a different second index for the entry of the particular file in response to the detecting that the particular file has a second attribute with a different second value, wherein the second executable thread starts execution at a different time than the first executable thread.

8. The method of claim 7,
wherein the first attribute is a time-to-live ("TTL") attribute and the first value indicates that the TTL attribute for the particular file has expired; and wherein the second attribute is a last access time and the second value indicates that the last access time is greater than a threshold access time.

9. The method of claim 1 further comprising:
obtaining, at the file system, a directory path and filename of each file of the subset of files from the identifier of each entry of the subset of entries identified from said querying.

10. The method of claim 9, wherein modifying the subset of files comprises:
purging the subset of files in response to the file system issuing a delete command to the different path and filename of each file of the subset of files.

11. The method of claim 1, wherein said tracking comprises:
identifying the set of files from a write queue of the file system, wherein the write queue comprises a list of modified files; and
scanning the at least one attribute of the set of files upon the set of files being written to the at least one storage device.

12. The method of claim 1, wherein said tracking comprises:
setting a first index of the set of entries for a first file of the set of files in response to detecting that a first attribute of the first file has changed at a first time; and
setting a second index of the set of entries for a second file of the set of files in response to detecting that a second attribute of the second file has changed at a different second time.

13. The method of claim 1 further comprising:
updating a second index, that is different than the particular index, while simultaneously performing the file operation against the subset of files identified from said querying.

14. The method of claim 1 further comprising:
removing the set of entries from the database in response to deleting the subset of files from storage as a result of performing the file operation.

15. A device comprising:
at least one storage device;
a database;
a file system; and
one or more processors configured to:
store, by operation of the file system, a plurality of files to the at least one storage device while creating an entry in the database for each file of the plurality of files, wherein each entry comprises an identifier that identifies a storage location of a different file on the at least one storage device;
track at least one attribute from a set of the plurality of files based on the file system setting a particular index in each entry of a set of entries created in the database for the set of files;
receive a file operation at the file system;
query the database for a subset of the set of entries having the particular index set to one or more values that satisfy a condition of the file operation, wherein the condition is defined using the at least one attribute; and
perform the file operation against a subset of the set of files that is identified on the at least one storage device from the identifier associated with each entry of the subset of entries, and wherein performing the file operation comprises modifying the subset of files on the at least one storage device according to the file operation.

16. The device of claim 15, wherein the one or more processors are further configured to:
- generate a first set of executable instances and an independently executing second set of executable instances within the file system;
- set the particular index in response to a first executable instance of the first set of executable instances running at a first interval or in response to a first set of events, wherein the particular index is a first index;
- set a second index in one or more of the set of entries in response to a second executable instance of the first set of executable instances running at a second interval, that is different than the first interval, or in response to a second set of events, that is different than the first set of events; and
- wherein performing the file operation comprises:
  - initiating execution of the second set of executable instances in response to receiving the file operation;
  - mapping the condition from the file operation to the particular index; and
  - selecting the subset of files based on results of said querying and without inspecting metadata of the set of files stored on the at least one storage device.

17. The device of claim 15,
- wherein said tracking comprises scanning metadata of the set of files, wherein the metadata comprises the at least one attribute; and
- wherein said querying comprises selecting the subset of files based on the subset of entries identified from said querying independently of said tracking or said scanning.

18. The device of claim 15, wherein the one or more processors are further configured to:
- scan the at least one file attribute of new or modified files from the set of files periodically with a first set of executable threads of the file system; and
- set, by operation of the first set of executable threads, the particular index for an entry of a particular file in response to detecting the particular file in the set of files with the at least one attribute having one or more specified values.

19. The device of claim 18, wherein the one or more processors are further configured to:
- generate at least one executable thread from a second set of executable threads of the file syst that execute independently of the first set of executable threads in response to receiving the file operation; and
- determine, by operation of the at least one executable thread of the second set of executable threads, the subset of files implicated by the file operation based on indexes in the database.

20. A non-transitory computer-readable medium, storing a set of processor-executable instructions, which, when executed by one or more processors, cause the one or more processors to:
- implement a file system that stores a plurality of files to at least one storage device and that creates an entry in a database for each file of the plurality of files, wherein each entry comprises an identifier that identifies a storage location of a different file on the at least one storage device
- track, by operation of the file system, at least one attribute from a set of the plurality of files based on the file system setting a particular index in each entry of a set of entries created in the database for the set of files;
- receive a file operation at the file system;
- query, by the file system, the database for a subset of the set of entries having the particular index set to one or more values that satisfy a condition of the file operation, wherein the condition is defined using the at least one attribute; and
- perform, by the file system, the file operation against a subset of the set of files that is identified on the at least one storage device from the identifier associated with each entry of the subset of entries, and wherein performing the file operation comprises modifying the subset of files on the at least one storage device according to the file operation.

* * * * *